(12) United States Patent
Livraghi

(10) Patent No.: US 7,866,151 B2
(45) Date of Patent: Jan. 11, 2011

(54) ANTI-SATURATION VALVE ASSEMBLY FOR LOAD SENSING HYDRAULIC SYSTEM

(75) Inventor: Isidoro Livraghi, Cassano D'Adda (IT)

(73) Assignee: Eaton Corporation, Cleveland, OH (US)

( * ) Notice: Subject to any disclaimer, the term of this patent is extended or adjusted under 35 U.S.C. 154(b) by 569 days.

(21) Appl. No.: 11/658,134

(22) PCT Filed: Jul. 22, 2005

(86) PCT No.: PCT/IB2005/002507

§ 371 (c)(1),
(2), (4) Date: Apr. 18, 2008

(87) PCT Pub. No.: WO2006/011058

PCT Pub. Date: Feb. 2, 2006

(65) Prior Publication Data

US 2008/0245064 A1    Oct. 9, 2008

(30) Foreign Application Priority Data

Jul. 22, 2004    (EP)    ................................ 04254369

(51) Int. Cl.
*B62D 5/07*    (2006.01)
*F15B 11/16*    (2006.01)

(52) U.S. Cl. ........................................ 60/422; 91/444

(58) Field of Classification Search .................... 60/422, 60/420, 384, 461, 462, 463; 91/444
See application file for complete search history.

(56) References Cited

U.S. PATENT DOCUMENTS

| | | | | |
|---|---|---|---|---|
| 3,455,210 | A | * | 7/1969 | Allen ............................ 91/446 |
| 4,043,419 | A | * | 8/1977 | Larson et al. .................. 60/420 |
| 5,207,059 | A | * | 5/1993 | Schexnayder ................. 91/444 |
| 6,076,350 | A | | 6/2000 | Deininger |

FOREIGN PATENT DOCUMENTS

DE    199 57 27 A1    5/2001

* cited by examiner

*Primary Examiner*—Thomas E Lazo
(74) *Attorney, Agent, or Firm*—Sonu N. Weaver

(57) ABSTRACT

An anti-saturation valve assembly (51) for use in a hydraulic system having priority (17) and auxiliary (25) load circuits, the priority circuit providing a priority load signal (19). The anti-saturation valve assembly includes a pressure sensor portion (61) which senses a decrease between pump pressure (23) and the priority load signal (19), and generates a force on a pressure reducing portion (63) to reduce, correspondingly, a pilot pressure (59): The reduced pilot pressure to a pilot valve (35) results in reduced flow to a pilot-operated main control valve (27) in the auxiliary load circuit (25), thus providing anti-saturation protection for the circuit, without throttling a main flow path and wasting substantial hydraulic power.

7 Claims, 5 Drawing Sheets

ANTI-SATURATION VALVE ASSEMBLY FOR LOAD SENSING HYDRAULIC SYSTEM

BACKGROUND OF THE DISCLOSURE

The present invention relates to load sensing hydraulic systems of the type including both a priority load circuit and an auxiliary load circuit, and more particularly, to such systems in which the control valve within the auxiliary load circuit operates by means of a pilot pressure command.

Load sensing hydraulic systems of the type to which the present invention relates are used in many applications, and are especially well suited for use on mobile, off-highway vehicles. By way of example only, on such a vehicle, the hydraulic system may include, as the priority load circuit, a hydrostatic power steering system. Such a system would typically communicate pressurized fluid to either a steering cylinder, to turn the vehicle wheels, or to a set of track motors, to vary the relative speeds of the left and right tracks, and thus turn the vehicle.

The load sensing hydraulic system of the type to which this invention relates would also include, as an auxiliary load circuit, some other hydraulically operated vehicle implement or "work circuit", such as a winch motor, or an auger motor, or a cylinder to raise and lower an implement, etc. Frequently, the "auxiliary load circuit" would actually comprise several auxiliary load circuits in parallel, each operating a different vehicle implement or work element.

As is well known to those skilled in the art of load sensing hydraulic systems, especially those of the type for use in "mobile" applications, it is greatly preferred to provide only a single source of pressurized fluid (i.e., a single pump) in order to minimize the cost and complexity of the overall vehicle hydraulic system. Unfortunately, as is also well known to those skilled in the art, one result of using only a single source is that the instantaneous demand for pressurized fluid and flow will occasionally exceed the pumping capacity of the single pump supplying the hydraulic circuit, a condition referred to in the art as "saturation" of the system.

In the conventional load sensing hydraulic system of the type which has been in widespread commercial usage, the system includes some sort of load sensing, priority, flow control valve ("LSPV"), to apportion the main, pressurized flow from the single pump between the priority and auxiliary load circuits, in response to a load signal generated by the priority load circuit. An example of such an LSPV is illustrated and described in U.S. Pat. No. 3,455,210, and an example of such a load sensing circuit is illustrated and described in U.S. Pat. No. 4,043,419, both of which are assigned to the assignee of the present invention and incorporated herein by reference.

Load sensing priority flow control valves and systems of the type illustrated and described in the above-cited patents have performed in a generally satisfactory manner in dealing with the above-described problem of the load circuits exceeding pump capacity ("saturation") and have therefore represented one workable solution to the saturation problem, i.e., the LSPV serves as one possible "anti-saturation" solution. However, because the load sensing priority valve operates on ("throttles") the main flow path from the pump to the priority and the auxiliary load circuits, the result is a substantial throttling loss, and therefore, a much less efficient overall hydraulic system than is now considered desirable. Furthermore, the inclusion of the typical LSPV in the hydraulic system adds substantially to the overall cost of the system, especially in view of the amount of hydraulic horsepower typically consumed in the LSPV.

Those skilled in the art of load sensing circuits, and especially, the anti-saturation art, will understand that there are various ways of categorizing the potential solutions to the problem. For example, under one of the ways of classifying anti-saturation solutions, the system in which the highest load has its pressure and/or flow reduced (until the pump can satisfy the system's demand), is termed a "pre-compensated" system. Alternatively, under that classification, the system in which all of the loads have their pressures and/or flows reduced proportionally (until the pump can satisfy the system's demand), is termed a "post-compensated" system. However, those skilled in the load sensing art have also used various other definitions to distinguish the terms "pre-compensated" and "post-compensated", and it should be understood that the present invention is not necessarily limited to use with just one or the other of the types of anti-saturation solutions, regardless of how those terms are defined.

BRIEF SUMMARY OF THE INVENTION

Accordingly, it is an object of the present invention to provide an improved hydraulic system of the type described above, which is able to provide an anti-saturation solution which overcomes the problems associated with the prior art solutions, as discussed above.

It is a more specific object of the present invention to provide such an improved load sensing hydraulic system in which the anti-saturation solution does not operate on (throttle) one of the main flow paths, thereby substantially reducing the hydraulic horsepower consumed as a result of the use of the anti-saturation solution.

It is a further object of the present invention to provide such an improved hydraulic system which accomplishes the above-stated objects, wherein the auxiliary load circuit is of the "remote", pilot-operated type.

The above and other objects of the invention are accomplished by the provision of a hydraulic system comprising a source of pressurized fluid, a priority load circuit receiving pressurized fluid from the source and providing a priority load signal, and an auxiliary load circuit receiving pressurized fluid from the source. The auxiliary load circuit includes a pilot-operated main control valve biased in a first direction by a first pilot signal, in opposition to the force of a first biasing spring, the pilot signal being provided by a first pilot valve having an inlet in fluid communication with a source of pilot pressure.

The improved hydraulic system is characterized by an anti-saturation valve assembly having an inlet in fluid communication with the source of pilot pressure, and an outlet in fluid communication with the inlet of the first pilot valve. The anti-saturation valve assembly includes a pressure reducing valve normally biased toward a first position communicating substantially the full pilot pressure from the inlet of the anti-saturation valve assembly to the inlet of the first pilot valve. The anti-saturation valve assembly further includes means for sensing the pressure difference between the source of pressurized fluid and the priority load signal. Included is a means operable to convert the pressure difference into a biasing force, when the pressure difference begins to decrease, the biasing force biasing the pressure reducing valve toward a second position communicating only a reduced pilot pressure to the inlet of the first pilot valve.

DETAILED DESCRIPTION OF THE PREFERRED EMBODIMENT

Figure 1:
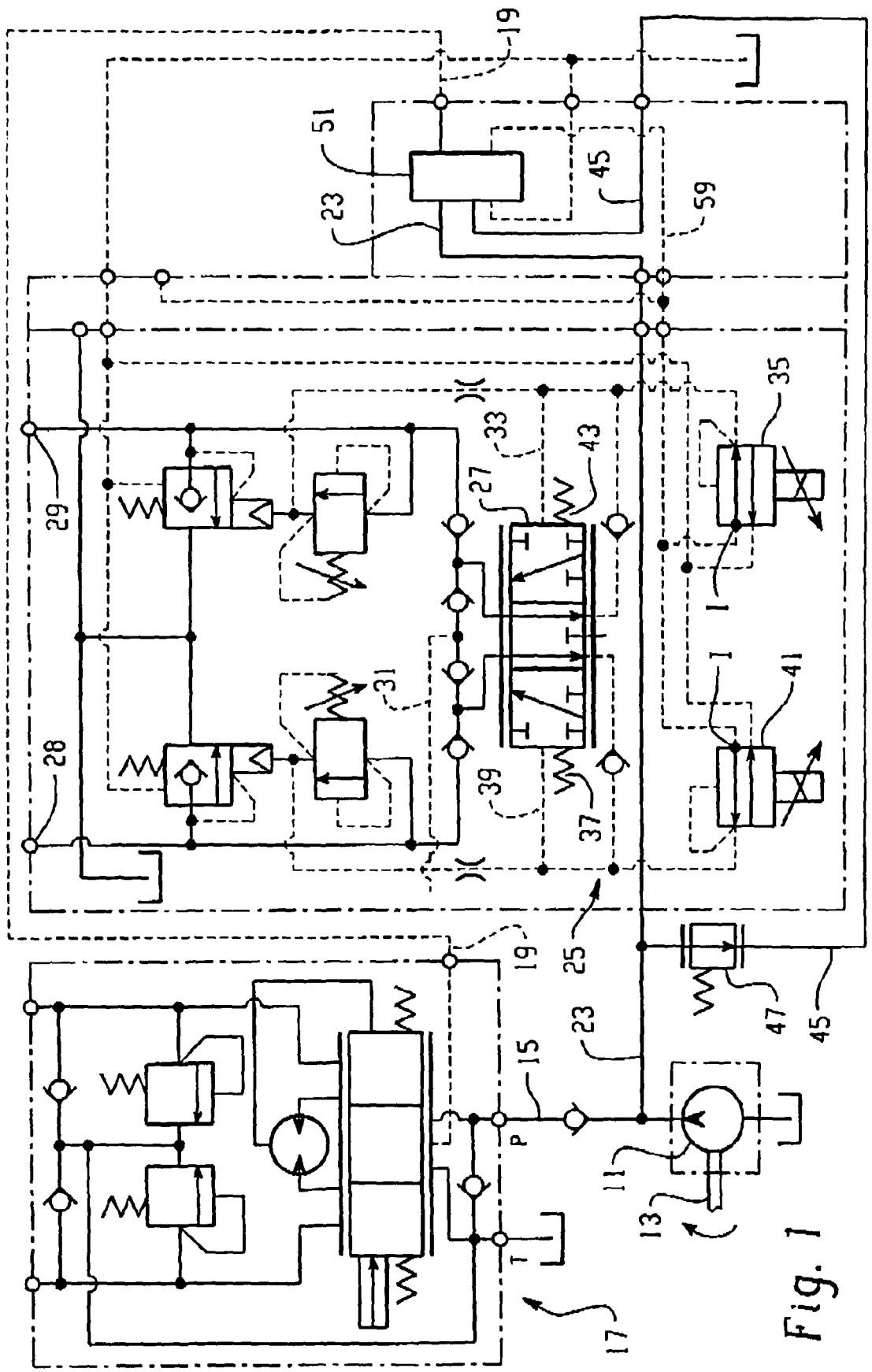
FIG. 1 is a somewhat simplified hydraulic schematic of a system of the type which may advantageously utilize the anti-saturation valve assembly of the present invention.

Referring now to the drawings, which are not intended to limit the invention, FIG. 1 is a schematic of a hydraulic system of the type with which the present invention may be utilized, it being understood that the hydraulic schematic of FIG. 1 is somewhat simplified, for ease of illustration. In the hydraulic system of FIG. 1, there is a single source of pressurized fluid for the entire system, the source being shown herein as a fixed displacement pump 11, receiving drive torque by means of an input shaft 13. The output of the pump 11 is communicated by means of a conduit 15 to a priority load circuit, generally designated 17, the details of which form no part of the present invention, except that the priority load circuit 17 generates a load signal 19 ("priority load signal"). In the subject embodiment, and by way of example only, the priority load circuit 17 is a vehicle hydrostatic power steering system.

Connected to the conduit 15, and in "hydraulic parallel" therewith, is a conduit 23 which communicates pressurized fluid from the pump 11 to at least one auxiliary load circuit, generally designated 25. The particular configuration and construction details of the auxiliary load circuit 25 are not essential features of the present invention, except to the extent specifically described hereinafter, and in the appended claims. The auxiliary load circuit 25 includes a main, meter-in control valve 27 operable to control the flow of pressurized fluid to either of a pair of ports 28 or 29, and to generate a load signal 31 ("auxiliary load signal") representative of the hydraulic load at one of the ports 28 or 29 (typically, whichever is at higher pressure). As is well known to those skilled in the art, and not shown herein in detail, the priority and auxiliary load signals 19 and 31 would typically be communicated to a shuttle valve, the output of which would be the higher of the two load signals. The output of the shuttle valve would then be communicated to a flow and pressure compensator (not shown in FIG. 1) of the pump 11, to control the fluid output thereof.

Movement of the main, meter-in control valve 27, to communicate pressurized flow to the port 28, occurs in response to a first pilot pressure 33 which is communicated to the valve 27 by means of a first solenoid-operated pilot valve 35. As is well known to those skilled in the art, such pilot valves are also sometimes referred to as "hydraulic remote control" valves (HRC's). The first pilot pressure 33 moves the main, meter-in control valve 27 in opposition to the force of a first compression spring 37. Alternatively, the main, meter-in control valve 27 may be moved to communicate pressurized fluid to the port 29 by a second pilot pressure 39 which is communicated to the valve 27 by means of a second solenoid-operated pilot valve 41. The second pilot pressure 39 moves the valve 27 in opposition to the force of a second compression spring 43. The remainder of the auxiliary load circuit 25, as shown in FIG. 1, comprises various cross-port relief valves, etc., which are well known in the art, are not especially relevant to the present invention, and therefore, will not be described further herein.

Referring still to FIG. 1, in communication with the conduit 23 is a conduit 45 having disposed therein a pressure reducing control valve 47. The conduit 45 will also be referred to hereinafter, and in the appended claims, as the "source of pilot pressure" for the pilot valves (HRC's) 35 and 41. As may be seen in FIG. 1, the conduit 45 comprises one of the inputs to an anti-saturation ("A-S") valve assembly, generally designated 51. Another input to the A-S valve assembly 51 is the pump output pressure, as communicated by the conduit 23. Those skilled in the art of HRC valves will understand that the pressure reducing control valve 47 is included because, regardless of the pump output pressure in the conduit 23, the pilot pressure in the conduit 45 is not typically permitted to be any more than about 730 psi. (about 50 bar). Finally, as an input the A-S valve assembly 51, there is the priority load signal 19.

Figure 2:
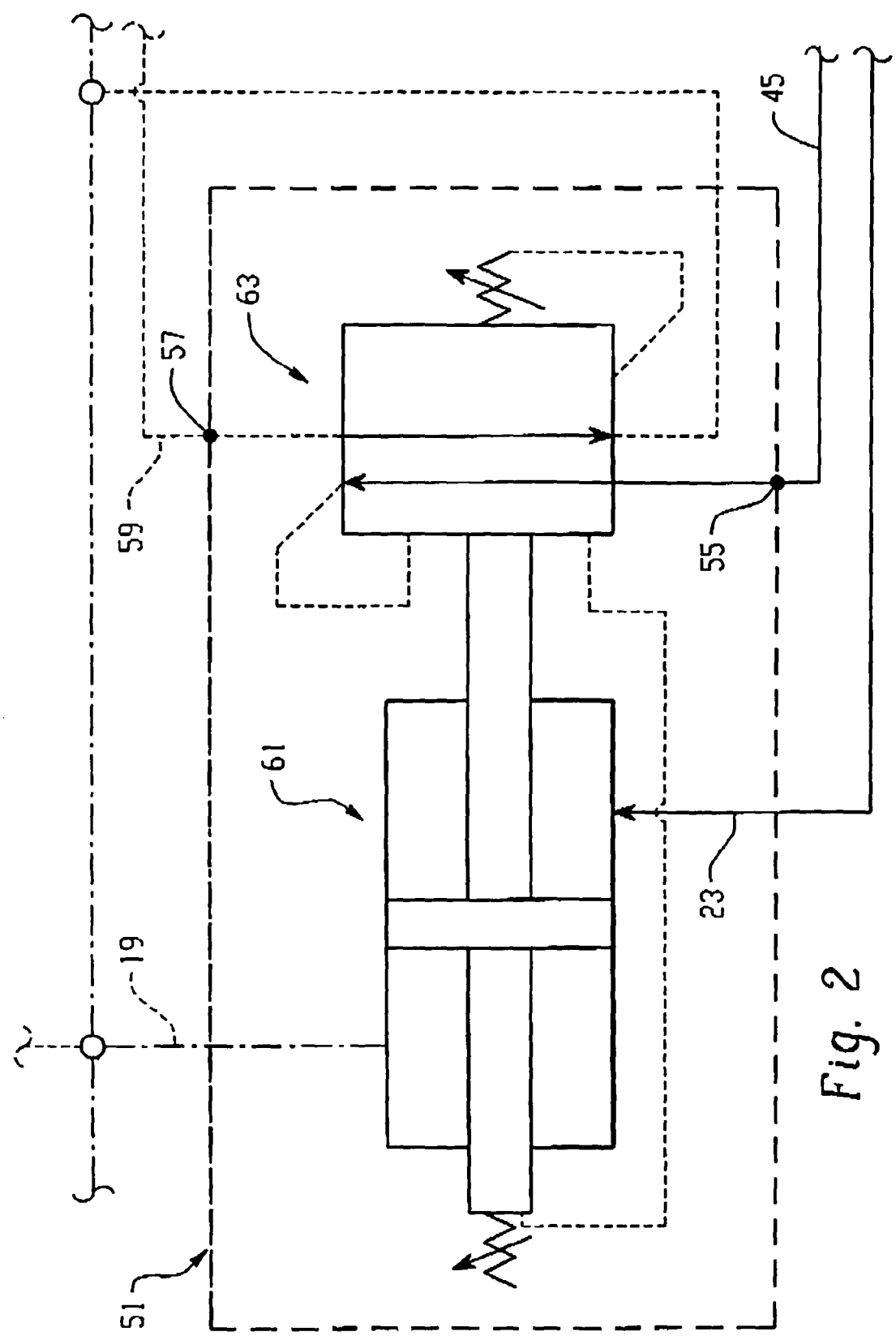
FIG. 2 is an enlarged, fragmentary schematic, showing primarily the anti-saturation valve assembly made in accordance with the present invention.

Referring now briefly to FIG. 2, there is an enlarged, schematic representation of the A-S valve assembly 51, showing the various inputs already described. The A-S valve assembly 51 includes an "inlet" port 55 in communication with the conduit 45 and an "outlet" port 57 which is connected to a conduit 59 which, in turn, is connected to the inlet ("I") of each of the pilot valves 35 and 41. Thus, subsequent references to the inlet of the pilot valves 35 and 41 will bear the references "35I" and "41I", respectively. Those skilled in the art of such hydraulic systems, and especially anti-saturation valve assemblies, will understand that the use of the terms "inlet" and "outlet" in connection with the ports 55 and 57 of the A-S valve assembly 51 may be somewhat misleading. It is one of the primary advantages of the anti-saturation valve assembly of the present invention that the A-S valve assembly 51 does not operate on a main flow path, but instead, merely controls a pilot pressure. Therefore, the terms "inlet" and "outlet" are used in regard to the ports 55 and 57 mainly for ease of reference, and not as an indication that any substantial amount of "flow" is occurring.

Referring again to FIG. 2, but now in conjunction with FIG. 3, the anti-saturation valve assembly 51 comprises a pressure sensor portion, generally designated 61, and a pressure reducing portion, generally designated 63, each of which will be described in substantially greater detail subsequently. For ease of illustration, and to facilitate comparison of FIGS. 3, 4 and 5 to the schematic of FIG. 2, no housing is shown in any of FIG. 3, 4, or 5. As will be understood by those skilled in the art, and to facilitate packaging and reduce total installed cost of the overall hydraulic system, each of the pressure sensor portion 61 and the pressure reducing portion 63 may comprise a "cartridge" type structure which may be threaded into an internally-threaded portion (not shown herein) of a housing in which is disposed a valve bore, communicating with the various ports and conduits, as shown in FIG. 3.

Figure 3:
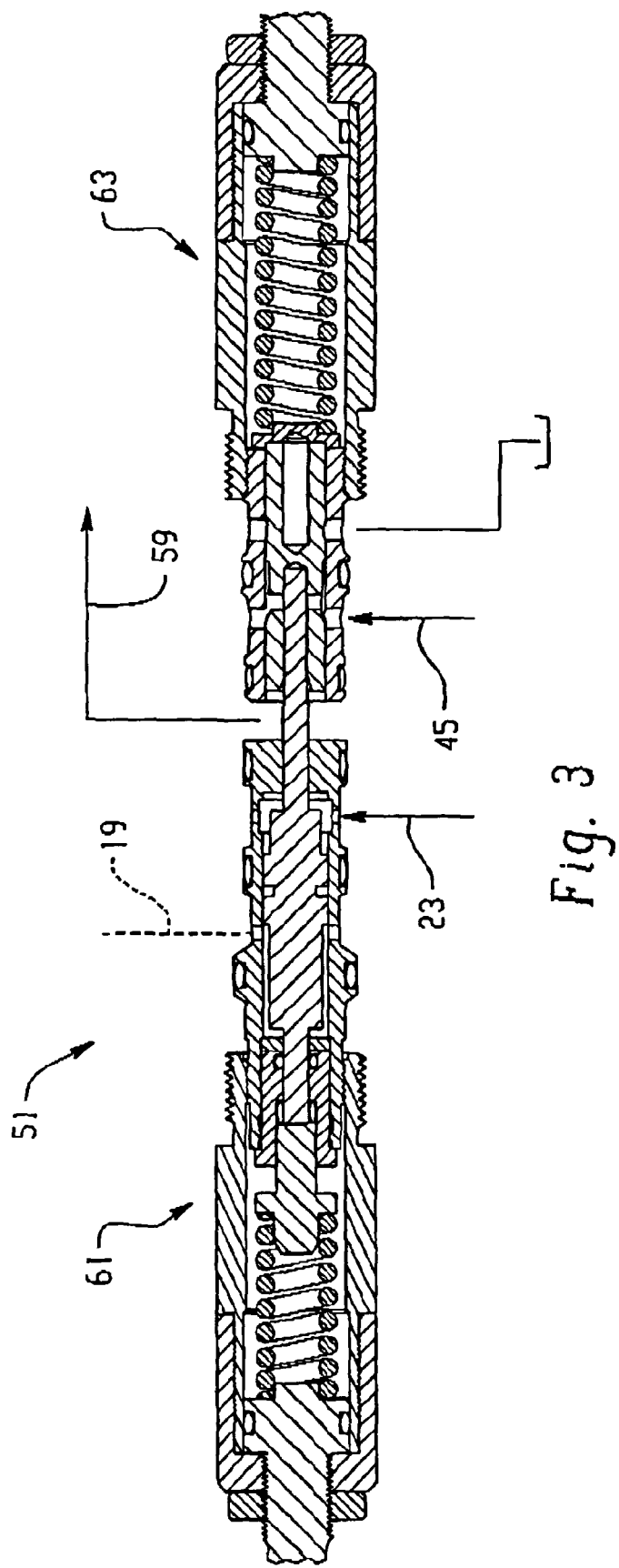
FIG. 3 is an axial cross-section of the entire anti-saturation valve assembly of the present invention, but not including a housing for the assembly.
Figure 4:
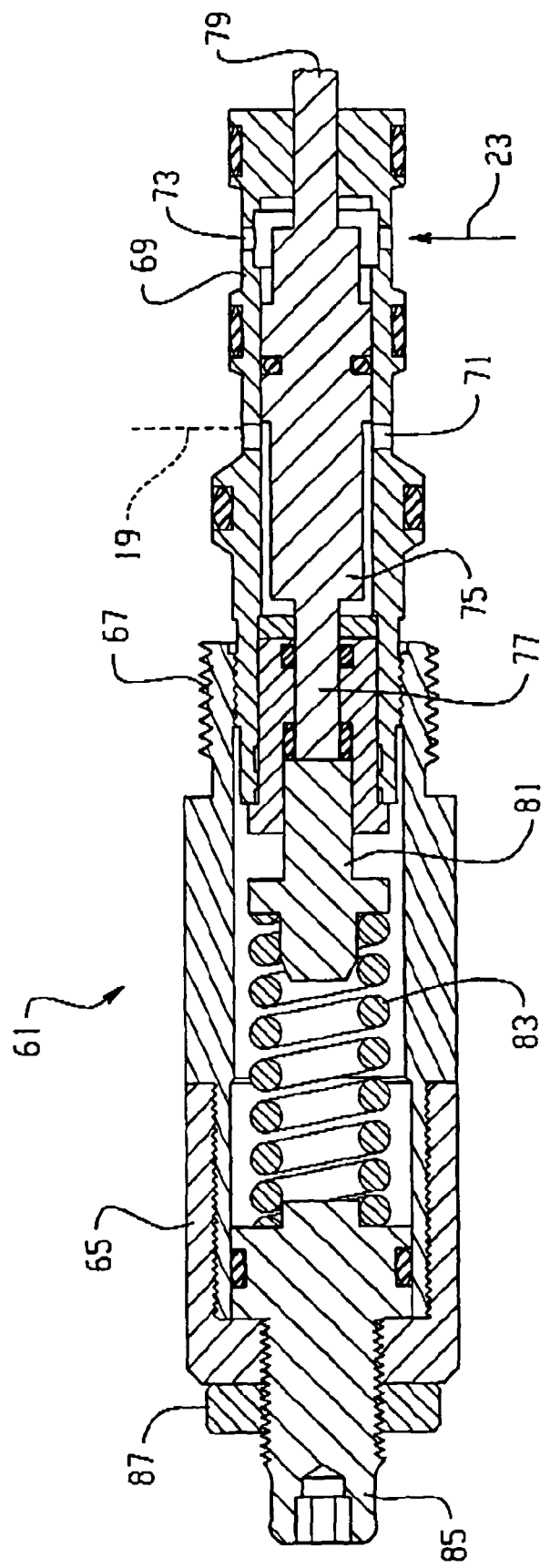
FIG. 4 is an enlarged, fragmentary axial cross-section, similar to FIG. 3, but showing only the pressure sensing portion of the anti-saturation valve assembly of the present invention.

Referring now primarily to FIG. 4, but in conjunction with FIG. 3, the pressure sensor portion 61 comprises a cartridge housing 65 including a set of external threads 67. In threaded engagement with a set of internal threads defined by the cartridge housing 65 is the leftward end of a body 69, including several axially spaced lands supporting O-rings, to separate the load signal 19 from the main system pressure, as contained in the conduit 23.

The body 69 defines a port 71 which receives the load signal 19, and further defines a port 73 (or, more likely, a plurality of circumferentially spaced ports), which receives system pressure from the conduit 23. Disposed within the body 69 and in sealing, sliding engagement therein, is a piston member 75 having an elongated, cylindrical portion 77 extending to the left in FIG. 4 and another elongated, cylindrical portion 79 extending to the right in FIG. 4.

The left end of the cylindrical portion 77 is seated against a spring seat member 81 which, in turn, serves as a seat for a helical compression spring 83. The end of the compression spring 83, axially opposite the seat member 81, is seated against a threaded adjustment member 85, which is adjusted to the position desired and then "fixed", at that particular position by means of a lock nut 87, in a manner well known to those skilled in the art. In the subject embodiment, and by way of example only, the compression spring 83 would typically exert a biasing force equivalent to that of the intended pressure differential across the priority load circuit 17 which, in the subject embodiment, is about 264 psi (18 bar).

Although not an essential feature of the present invention, it has been found desirable in the particular embodiment of the present invention being developed for commercial use, to have a pressure sensor portion 61 which is designed to have a "1:1" pressure ratio. In other words, the cylindrical portion 77 and the cylindrical portion 79 have substantially identical diameters, and therefore, the area of the piston member 75 exposed to system pressure from the conduit 23 is substantially equal to the area of the piston member 75 which is subjected to the load signal 19.

Figure 5:
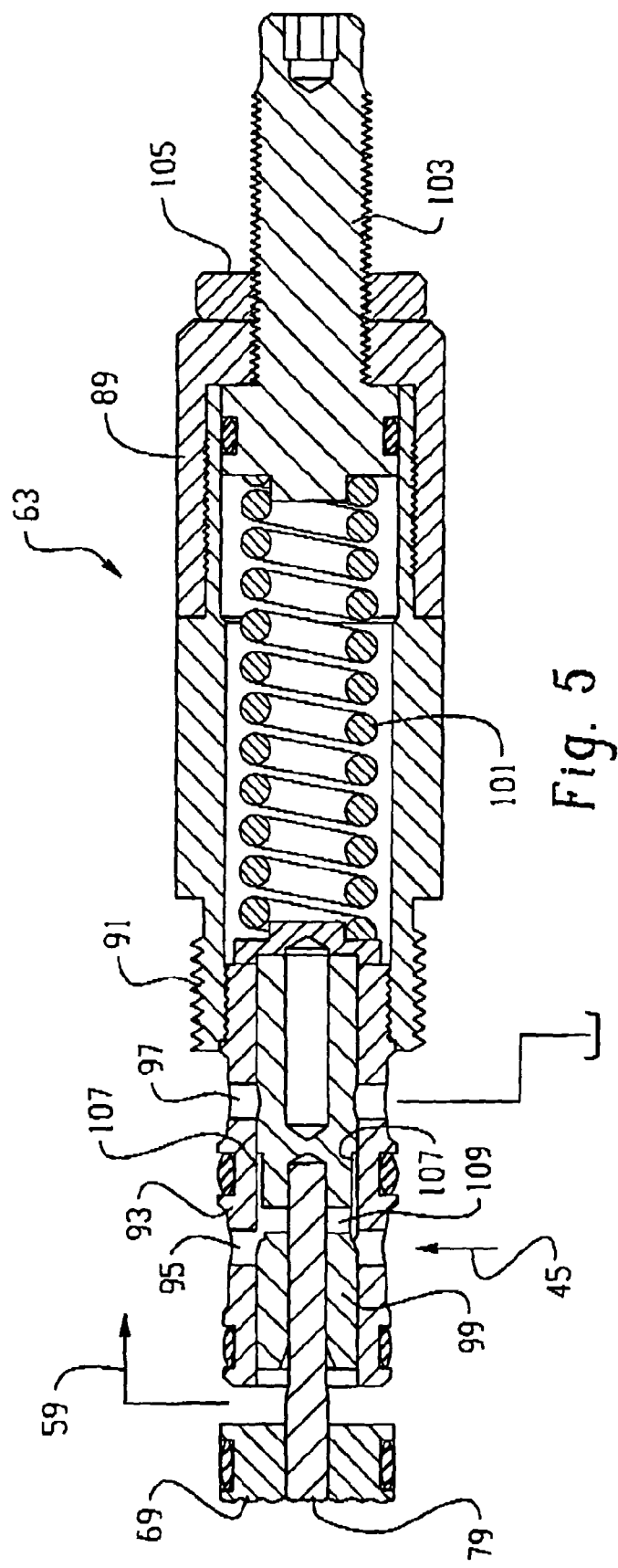
FIG. 5 is an enlarged, fragmentary axial cross-section, on about the same scale as FIG. 4, showing only the pressure reducing portion of the anti-saturation valve assembly of the present invention.

Referring now primarily to FIG. 5, but in conjunction with FIGS. 3 and 4, the pressure reducing portion 63, which is quite similar, in overall structure, to the pressure sensor portion 61, comprises a cartridge housing 89 defining a set of external threads 91. In threaded engagement with an internally threaded portion of the cartridge housing 89 is a body 93 which defines one or more ports 95, (or, more likely, a plurality of circumferentially spaced ports), in fluid communication, by means of the inlet port 55, with the source of pilot pressure in the conduit 45. The body 93 also defines one or more ports 97 (or, more likely, a plurality of circumferentially spaced ports), in communication with a system reservoir.

Disposed within the body 93 is a valve spool 99 which, at its right end in FIG. 5, serves as a seat for a helical compression spring 101, with the axially opposite end of the spring 101 being seated against a threaded adjustment member 103. As in the case of the pressure sensor portion 61, once the adjustment member 103 is set at the desired position, as will be described subsequently, it is "fixed" at that particular position by means of a lock nut 105. The compression spring 101 would typically be set to exert a biasing force equal to at least the sum of the pressure differential across the priority load circuit 17 plus the "cracking" pressure of the main, meter-in control valve 27. In the subject embodiment, and by way of example only, the compression spring 101 exerts a biasing force equivalent to about 338 psi (about 23 bar).

Preferably, the valve spool 99 defines a small radial clearance (no reference numeral shown) about the cylindrical portion 79 for reasons to be described subsequently. In all operating conditions, the pilot pressure in the conduit 45 would be present in the ports 95. The valve spool 99 defines a series of axial slots 107 by means of which the pilot pressure in the ports 95 is communicated to a plurality of radial holes 109 defined by the valve spool 99, the radial holes being in communication with the radial clearance defined by the valve spool 99. The pilot pressure in the radial clearance is communicated to the chamber between the body 69 and the left end of the valve spool 99, where the pilot pressure (i.e., the pressure in the conduit 59) biases the valve spool 99 to the right in FIG. 5, in opposition to the force of the compression spring 101.

For purposes of the subsequent description of the operation of the anti-saturation valve assembly 51 of the present invention, it should be noted that the positions of the portions 61 and 63 (in FIGS. 3, 4 and 5) correspond to the normal operating condition. In this "normal" operating condition, the pump 11 is, instantaneously, able to satisfy the demand for flow and pressure by both the priority load circuit 17 and the auxiliary load circuit 25. The position of the portions 61 and 63 would still be the same if there were multiple auxiliary load circuits, rather than just the single auxiliary load circuit 25.

Referring now primarily to FIGS. 4 and 5, the operation of the anti-saturation valve assembly 51 will be described, with regard to its operation during the "saturation" mode, i.e., when the demand for pressurized fluid by the load circuits 17 and 25 is greater than the capacity of the pump 11. As is well known to those skilled in the load sensing art, and specifically, in the anti-saturation art, when the capacity of the pump 11 is no longer sufficient to meet the demands of the circuits 17 and 25, the normal "standby" pressure of the pump 11 (i.e., the "margin" between pump output pressure and the load signal 19) begins to decrease. As a result, the piston member 75 is no longer in the normal, equilibrium condition represented in FIG. 4, and instead, the compression spring 83 begins to bias the piston member 75 toward the right in FIGS. 4 and 5, as the pressure in the conduit 23 (acting on the right side of the member 75) decreases relative to the load signal 19 (acting on the left side of the piston member 75). The extent of rightward movement of the piston member 75 will be generally proportional to the extent to which the pressure in the conduit 23 decreases, relative to the load signal 19.

Referring now primarily to FIG. 5, as the piston member 75 moves in a rightward direction, the cylindrical portion 79 moves the valve spool 99 in the rightward direction by a corresponding amount, to achieve a reduction in the pressure differential between the source 23 and the load signal 19. As the valve spool 99 is moved toward the right in FIG. 5, the extent of fluid communication between the ports 95 and the axial slots 107 is correspondingly reduced. Thus, there is a metering action, and a pressure drop, from the ports 95 to the axial slots 107, such that the pilot pressure contained in the conduit 59 is decreased from the "nominal" pilot pressure in the source of pilot pressure (i.e., the conduit 45). As the actual pilot pressure in the conduit 59 is decreased, the reduced pressure at the inlets ("I") of the pilot valves 35 and 41 will result in a corresponding reduction in the pilot pressures 33 and 39, and a corresponding reduction in the movement of the main, meter-in control valve 27. Reducing the movement of the main, meter-in control valve 27, for a given input command signal, will reduce the flow through the auxiliary load circuit 25, thus enabling the pump 11 to "catch-up" to the demand for fluid, and again to be able to satisfy the total demand (i.e., the "new" revised demand) for pressurized flow by the load circuits 17 and 25.

Preferably, the piston member 75 and the valve spool 99 are sized, relative to each other, such that there is effectively a 1:1 ratio between the pressure sensor portion 61 and the pressure reducing portion 63. In other words, if there is a decrease of 73 psi (5 bar) in the differential between the source of pressure in the conduit 23 and the load signal 19, there will also be a decrease of 73 psi (5 bar) in the pilot pressure communicated through the conduit 59. It should be understood that the 1:1 ratio between the pressure sensor portion 61 and the pressure reducing portion 63 is not essential, but it is preferred. If the ratio is higher than 1:1 (pilot pressure changes faster than the difference between the source 23 and the load signal 19), the result may be pressure spikes or instability. If the ratio is lower than 1:1 (the pilot pressure changes slower), there may be excessive, undesirable hysteresis in the system. It should be noted in connection with FIG. 5 that, as the pilot pressure communicated to the conduit 59 decreases, there is a corresponding decrease in the pressure tending to bias the valve spool 99 to the right in FIG. 5, such that the overall effect of the arrangement shown is that it is somewhat "self-compensating".

Although not shown herein in detail, the pilot pressure, as contained in the conduit 59, is communicated into the spring chamber defined by the cartridge housing 65, i.e., the spring chamber containing the compression spring 83. The presence of the pilot pressure in that spring chamber will serve to dampen axial movements of the spring seat member 81, and thus, enhance the stability of the pressure sensor portion 61. As a result, the ongoing, small variations in the pressure difference between the system pressure in the conduit 23 and the load signal 19 will not cause corresponding changes in the pilot pressure in the conduit 59.

It should be understood by those skilled in the art that the particular construction of the pressure sensor portion 61 is not an essential feature of the present invention. Instead, all that is essential is that there be some sort of "sensor" capable of sensing the decreasing margin (or difference) between system pressure and load signal 19, during saturation, and further capable of transmitting that decreasing margin into corresponding movement of the pressure reducing portion 63, to correspondingly decrease the pilot pressure to the HRC's 35 and 41.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

The invention claimed is:

1. In a hydraulic system comprising a source (11) of pressurized fluid, a priority load circuit (17) receiving pressurized fluid from said source (11) and providing a priority load signal (19), and an auxiliary load circuit (25) receiving pressurized fluid from said source (11); said auxiliary load circuit (25) including a pilot-operated main control valve (27) biased in a first direction by a first pilot signal (33), in opposition to the force of a first biasing spring (37), said first pilot signal (33) being provided by a first pilot valve (35) having an inlet (35I) in fluid communication with a source (45) of pilot pressure; said hydraulic system being characterized by:
    (a) an anti-saturation valve assembly (51) having an inlet (55) in fluid communication with said source (45) of pilot pressure, and an outlet (57) in fluid communication with said inlet (35I) of said first pilot valve (35);
    (b) said anti-saturation valve assembly (51) including a pressure reducing valve (63) normally biased toward a first position (FIG. 5) communicating substantially said full pilot pressure from said inlet (55) of said anti-saturation valve assembly (51) to said inlet (35I) of said first pilot valve (35);
    (c) said anti-saturation valve assembly (51) further including means (61) for sensing the pressure difference between said source (11) of pressurized fluid, and said priority load signal (19); and
    (d) means (83,79) operable to convert said pressure difference into a biasing force, when said pressure difference begins to decrease, said biasing force biasing said pressure reducing valve (63) toward a second position communicating only a reduced pilot pressure to said inlet (35I) of said first pilot valve (35).

2. In a hydraulic system as claimed in claim 1, characterized by said pilot-operated main control valve (27) being biased in a second direction by a second pilot signed (39), in opposition to the force of a second biasing spring (43), said second pilot signal being provided by a second pilot valve (41) having an inlet (41I) in fluid communication with said source (45) of pilot pressure.

3. In a hydraulic system as claimed in claim 2, characterized by said anti-saturation valve assembly (51) being in fluid communication with said inlet (41I) of said second pilot valve (41).

4. In a hydraulic system as claimed in claim 1, characterized by said means (61) for sensing said pressure difference comprising a piston member (75) having one area subject to said source (11) of pressurized fluid, and an opposite area subject to said priority load signal (19).

5. In a hydraulic system as claimed in claim 4, characterized by said piston member (75) comprising an equal area piston in which said one area and said opposite area are substantially equal.

6. In a hydraulic system as claimed in claim 1, characterized by said pressure reducing valve (63) including a valve spool (99) providing maximum fluid communication in said first position (FIG. 5), and a decreasing communication as said valve spool (99) is biased toward said second position, thus communicating reduced pilot pressure to said first pilot valve (35).

7. In a hydraulic system as claimed in claim 1, characterized by: (a) said means (61) for sensing the pressure difference between said source (11) and said load signal (19); and (b) said pressure reducing valve (63) being selected such that for a given decrease in said difference between said source and said load signal, there is a corresponding decrease from said full pilot pressure to said reduced pilot pressure.

\* \* \* \* \*